No. 819,099. PATENTED MAY 1, 1906.
W. B. VESTAL.
CHURN DASHER.
APPLICATION FILED APR. 20, 1904.
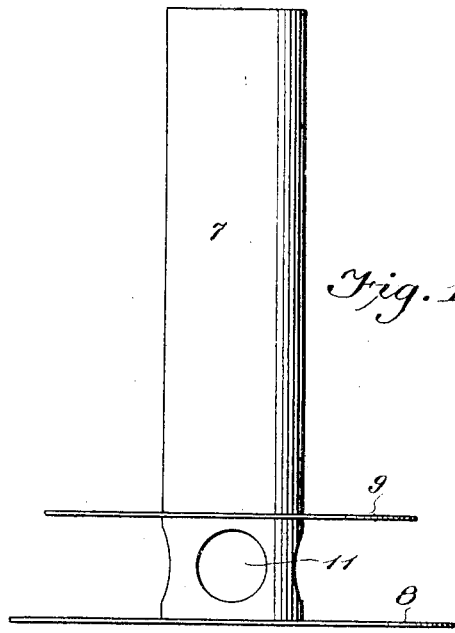
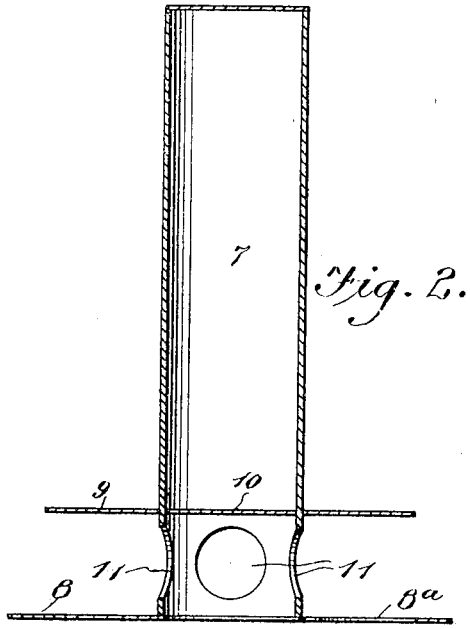
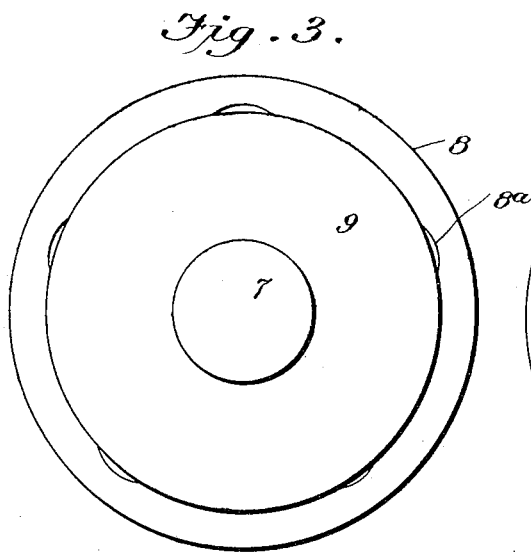
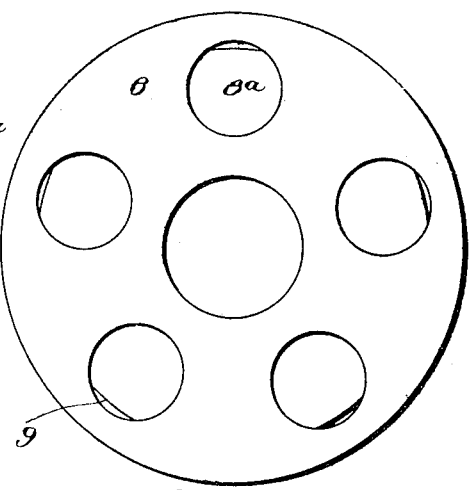
Witnesses
F. A. Barron
M. A. Schmidt
William B. Vestal, Inventor
by
Milo B. Stevens & Co. Attorneys

UNITED STATES PATENT OFFICE.

WILLIAM B. VESTAL, OF DALLAS, TEXAS.

CHURN-DASHER.

No. 819,099.     Specification of Letters Patent.     Patented May 1, 1906.

Application filed April 20, 1904. Serial No. 204,042.

*To all whom it may concern:*

Be it known that I, WILLIAM B. VESTAL, a citizen of the United States, residing at Dallas, in the county of Dallas and State of Texas, have invented new and useful Improvements in Churn-Dashers, of which the following is a specification.

My invention relates to churn-dashers, and has for its object to thoroughly agitate the cream and to distribute air therein.

In the drawings, Figure 1 is an elevation of the dasher, and Fig. 2 a vertical section thereof. Figs. 3 and 4 are top and bottom plan views, respectively.

Referring specifically to the drawings, the stem or handle of the dasher is indicated at 7, having at its lower end an outwardly-extending circular base plate 8, which has a number of openings $8^a$ extending therethrough. The lower end of the stem is hollow or tubular, and it opens at the bottom through the plate 8. A short distance above the plate 8 another plate 9 extends outwardly from the stem. This is somewhat smaller than the first-mentioned plate and has no openings. A partition 10 extends across the inside of the stem in line with the plate 9, and between this plate and the base-plate a number of openings 11 are formed in the stem.

The operation of the invention is as follows: When the dasher is reciprocated, as usual, the milk will be thoroughly agitated and at the same time air will be forced therethrough by the suction through the openings in the stem, whereby the cream will be aerated and also thoroughly agitated. The plate 9 serves as a baffle to distribute the air.

Having thus described my invention, what is claimed as new, and desired to be secured by Letters Patent, is—

A churn-dasher comprising a tubular stem open at the bottom and having a perforated base-plate extending outwardly therefrom, an imperforate baffle-plate extending outwardly from the stem above said base-plate, and a partition extending across within the stem to close the same and form the top of an air-chamber in the lower end thereof, the stem having openings through the wall thereof, from said chamber, between the plates.

In testimony whereof I have signed my name to this specification in the presence of two subscribing witnesses.

WILLIAM B. VESTAL.

Witnesses:
   C. M. BOLLES,
   C. COLLINS.